US012503605B2

United States Patent
Nakada et al.

(10) Patent No.: US 12,503,605 B2
(45) Date of Patent: Dec. 23, 2025

(54) LOW-DIELECTRIC-TANGENT SILICA SOL, AND METHOD FOR PRODUCING LOW-DIELECTRIC-TANGENT SILICA SOL

(71) Applicant: NISSAN CHEMICAL CORPORATION, Tokyo (JP)

(72) Inventors: Takeshi Nakada, Sodegaura (JP); Kazuya Ebara, Sodegaura (JP); Megumi Araki, Sodegaura (JP); Masatoshi Sugisawa, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/579,628

(22) PCT Filed: Jan. 25, 2023

(86) PCT No.: PCT/JP2023/002302
§ 371 (c)(1),
(2) Date: Jan. 16, 2024

(87) PCT Pub. No.: WO2023/145780
PCT Pub. Date: Aug. 3, 2023

(65) Prior Publication Data
US 2024/0270973 A1    Aug. 15, 2024

(30) Foreign Application Priority Data
Jan. 28, 2022   (JP) ................................. 2022-012170

(51) Int. Cl.
C09C 3/12     (2006.01)
C08K 9/06     (2006.01)
C09C 1/30     (2006.01)

(52) U.S. Cl.
CPC ............. *C09C 1/3081* (2013.01); *C08K 9/06* (2013.01); *C09C 3/12* (2013.01); *C01P 2002/86* (2013.01); *C01P 2004/62* (2013.01); *C01P 2004/64* (2013.01); *C01P 2006/12* (2013.01); *C01P 2006/40* (2013.01); *C08K 2201/005* (2013.01); *C08K 2201/006* (2013.01); *C08K 2201/011* (2013.01)

(58) Field of Classification Search
CPC ................................ C09C 1/3081; C09C 3/12
See application file for complete search history.

(56) References Cited

U.S. PATENT DOCUMENTS

2016/0068664 A1    3/2016   Suemura et al.
2018/0355117 A1    12/2018  Murakami et al.
2020/0189922 A1    6/2020   Watanabe et al.
2021/0309834 A1    10/2021  Kuroiwa et al.
2022/0017724 A1    1/2022   Hida et al.
2022/0025243 A1    1/2022   Murakami et al.
2022/0169832 A1    6/2022   Okabe et al.
2022/0396490 A1*   12/2022  Kamo ....................... C09C 1/30

FOREIGN PATENT DOCUMENTS

| JP | 2001151910 A | * | 6/2001 | |
| JP | 2004-269636 A | | 9/2004 | |
| JP | 2012-136363 A | | 7/2012 | |
| JP | 5092744 B2 | * | 12/2012 | ............. B32B 27/08 |
| JP | 2014-24916 A | | 2/2014 | |
| JP | 5862886 B2 | | 2/2016 | |
| JP | 6546386 B2 | | 7/2019 | |
| JP | 2020-097498 A | | 6/2020 | |
| JP | 6793282 B1 | | 12/2020 | |
| JP | 6813815 B1 | | 1/2021 | |
| WO | 2014/188934 A1 | | 11/2014 | |
| WO | 2016/181997 A1 | | 11/2016 | |
| WO | 2020/059213 A1 | | 3/2020 | |
| WO | 2020/230823 A1 | | 11/2020 | |
| WO | 2021/220756 A1 | | 11/2021 | |
| WO | 2022/181018 A1 | | 9/2022 | |

OTHER PUBLICATIONS

Apr. 18, 2023 Written Opinion in International Application No. PCT/JP2023/002302.
"Thorough search for new next-generation low-dielectric materials targeting 2020-2030": Fuji Chimera Research Institute, Inc. (Dec. 10, 2019), pp. 2-3.
Apr. 18, 2023 International Search Report issued in International Application No. PCT/JP2023/002302.
Apr. 17, 2024 Office Action issued in Chinese Application No. 202380012875.0.
Jun. 18, 2025 Office Action issued in European Application No. 23746991.1.
Jul. 2, 2025 Office Action issued in European Application No. 23 746 991.1.

* cited by examiner

*Primary Examiner* — Vickey Nerangis
(74) *Attorney, Agent, or Firm* — Oliff PLC

(57) ABSTRACT

Silica particles have a dielectric loss tangent of 0.01 or less at 1 GHz and satisfy the requirements (i), (ii) and (iii): (i) an average primary particles diameter of 5 nm to 120 nm; (ii) a ratio of a specific surface area by water vapor adsorption ($S_{H2O}$) to a specific surface area by nitrogen adsorption ($S_{N2}$); i.e., ($S_{H2O}/S_{N2}$) of 0.6 or less; and (iii) a total silanol group content of 5% or less as determined by the following Formula (1): total silanol group content (%)=(Q2×2/4+Q3×1/4+Q4×0/4) ... Formula (1) [in Formula (1), each of Q2, Q3 and Q4 is the proportion (%) of the peak areas derived from silicon atom structures], and a silica dispersion.

18 Claims, No Drawings

LOW-DIELECTRIC-TANGENT SILICA SOL, AND METHOD FOR PRODUCING LOW-DIELECTRIC-TANGENT SILICA SOL

TECHNICAL FIELD

The present invention relates to silica particles having a low dielectric loss tangent, a dispersion of the silica particles, and a production method therefor.

BACKGROUND ART

In recent years, the use of high-frequency bands has been expanding in electronic devices, communication devices, etc. in association with an increase in the amount of information and communications in the communication field, such as 5G.

Since the application of high frequency bands may cause a problem of increased transmission loss of circuit signals, a material having a low dielectric loss tangent is generally used for an insulator forming electrical and electronic components such as an antenna, a circuit, and a substrate. In general, many polymer materials used as insulator materials have a low dielectric constant, but a high dielectric loss tangent. Meanwhile, many ceramic materials have the opposite characteristics. Thus, ceramic filler-filled polymer materials prepared from a combination of these materials and achieving the compatibility between low dielectric constant and low dielectric loss tangent are becoming popular (Patent Documents 1 and 2).

Fused silica having a micron-order size is generally widely used as the aforementioned ceramic filler (inorganic filler). However, coarse particles generated during production of the fused silica have a significant impact on the performance of a molded product, and thus separation and removal of the coarse particles is an issue (Non-Patent Document 1 and Patent Documents 2, 3, and 4).

Meanwhile, silica particles having an average particle diameter on the order of nanometers are less likely to generate coarse particles during production of the silica particles, and they can be filtered and centrifuged. Thus, the silica particles are advantageous in that they can be readily separated and removed, even if coarse particles are generated. In addition, nano-order particles are considered to have various advantages, such as the ability to be applied to transparent polymer materials, and a greater combined effect than micron-order fillers (Patent Documents 5 and 6).

PRIOR ART DOCUMENTS

Patent Documents

Patent Document 1: JP 2014-24916 A
Patent Document 2: JP 6793282 B
Patent Document 3: JP 2004-269636 A
Patent Document 4: JP 6546386 B
Patent Document 5: JP 5862886 B
Patent Document 6: JP 6813815 B

Non-Patent Documents

Non-Patent Document 1: Thorough search for new next-generation low-dielectric materials targeting 2020-2030, Fuji Chimera Research Institute, Inc., December, 2019, No. 831906736

SUMMARY OF THE INVENTION

Problems to be Solved by the Invention

As described above, nano-order particles have various advantages in a ceramic filler, but existing nano-order particles have a high dielectric loss tangent, making it difficult to apply them to a material for, for example, an electronic device that operates in a high frequency band.

The present invention has been made in view of the aforementioned circumstances, and an object of the present invention is to provide nano-order particles having a low dielectric loss tangent; specifically, silica particles having a dielectric loss tangent of 0.01 or less at 1 GHz and a dispersion of the silica particles.

Means for Solving the Problems

The present inventors have conducted extensive studies for solving the aforementioned problems, and as a result have found that silica particles having an average primary particle diameter of 5 nm to 120 nm, a ratio of a specific surface area by water vapor adsorption to a specific surface area by nitrogen adsorption of 0.6 or less, and a total silanol group content of 5% or less exhibit low dielectric properties; i.e., a dielectric loss tangent of 0.01 or less at 1 GHz. The present invention has been accomplished on the basis of this finding.

The present inventors have also found that surface-modified silica particles prepared by modifying at least a portion of the surface of each of the aforementioned silica particles with an organic silicon compound having an alkyl group and/or a substituent having an unsaturated bond exhibit low dielectric property; i.e., a dielectric loss tangent of 0.01 or less at 1 GHz. The present invention has been accomplished on the basis of this finding.

Accordingly, a first aspect of the present invention is silica particles having a dielectric loss tangent of 0.01 or less at 1 GHz and satisfying the following (i), (ii), and (iii).

(i) an average primary particle diameter of 5 nm to 120 nm;
(ii) a ratio of a specific surface area by water vapor adsorption ($S_{H2O}$) to a specific surface area by nitrogen adsorption ($S_{N2}$); i.e., ($S_{H2O}/S_{N2}$) of 0.6 or less; and
(iii) a total silanol group content of 5% or less as determined by the following Formula (1):

$$\text{total silanol group content (\%)} = (Q2 \times 2/4 + Q3 \times 1/4 + Q4 \times 0/4) \quad \text{Formula (1)}$$

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms].

A second aspect of the present invention is the silica particles according to the first aspect, characterized in that at least a portion of the surface of each of the silica particles is coated with an organic silicon compound having at least one substituent selected from the group consisting of an alkyl group, a $C_{6-12}$ aryl group, and a substituent having an unsaturated bond.

A third aspect of the present invention is the silica particles according to the first aspect, wherein at least a portion of the surface of each of the silica particles is bonded to at least a portion of an organic silicon compound having at least one substituent selected from the group consisting of an alkyl group, a $C_{6-12}$ aryl group, and a substituent having an unsaturated bond.

A fourth aspect of the present invention is the silica particles according to the second or third aspect, wherein the substituent of the organic silicon compound is at least one selected from the group consisting of a $C_{1-10}$ alkyl group, a phenyl group, a phenylmethyl group, and a vinyl group.

A fifth aspect of the present invention is the silica particles according to any one of the second to fourth aspects, wherein the organic silicon compound is a compound having the substituent and a hydrolyzable group.

A sixth aspect of the present invention is the silica particles according to the second or third aspect, wherein the organic silicon compound is at least one selected from among compounds of the following Formulae (a) to (g):

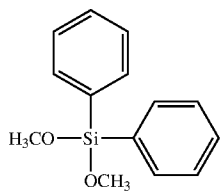

Formula (a)

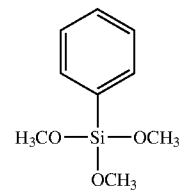

Formula (b)

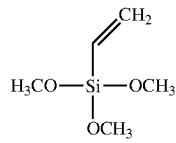

Formula (c)

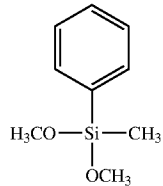

Formula (d)

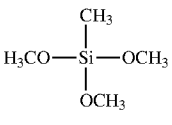

Formula (e)

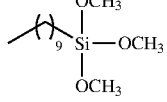

Formula (f)

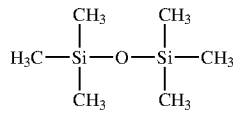

Formula (g)

A seventh aspect of the present invention is the silica particles according to any one of the second to sixth aspects, wherein the surfaces of the silica particles are coated with or bonded to the organic silicon compound in an amount of 0.5 to 6 molecules per $nm^2$ of the surface area of the silica particles.

An eighth aspect of the present invention is a silica dispersion comprising the silica particles according to the first aspect dispersed in water or an organic solvent.

A ninth aspect of the present invention is a silica dispersion comprising the silica particles according to any one of the second to seventh aspects dispersed in at least one organic solvent selected from among alcohols, ketones, hydrocarbons, amides, ethers, esters, or amines.

A tenth aspect of the present invention is a composite material comprising the silica particles according to any one of the second to seventh aspects, and an organic resin material.

An eleventh aspect of the present invention is the composite material according to the tenth aspect, wherein the organic resin material is at least one selected from the group consisting of epoxy resin, phenolic resin, acrylic resin, maleimide resin, polyurethane, polyimide, polytetrafluoroethylene, cycloolefin polymer, unsaturated polyester, vinyltriazine, crosslinkable polyphenylene oxide, and curable polyphenylene ether.

A twelfth aspect of the present invention is the composite material according to the tenth or eleventh aspect, wherein the composite material is used for an application selected from the group consisting of a semiconductor device material, a copper-clad laminate, a flexible wiring material, a flexible display material, an antenna material, an optical wiring material, and a sensing material.

A thirteenth aspect of the present invention is a production method for surface-modified silica particles, the production method comprising a step of mixing, in an organic solvent, silica particles having an average primary particle diameter of 5 nm to 120 nm, a ratio of a specific surface area by water vapor adsorption ($S_{H2O}$) to a specific surface area by nitrogen adsorption ($S_{N2}$); i.e., ($S_{H2O}/S_{N2}$) of 0.6 or less, and a total silanol group content of 5% or less as determined by the following Formula (1):

$$\text{total silanol group content (\%)} = \frac{}{(Q2 \times 2/4 + Q3 \times 1/4 + Q4 \times 0/4)}$$

Formula (1)

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms]

with an organic silicon compound having at least one substituent selected from the group consisting of an alkyl group, a $C_{6-12}$ aryl group, and a substituent having an unsaturated bond.

A fourteenth aspect of the present invention is a production method for surface-modified silica particles, the production method comprising the following steps (A) to (C):

step (A): a step of preparing a silica sol containing silica particles having an average primary particle diameter of 5 to 120 nm, a ratio of a specific surface area by water vapor adsorption ($S_{H2O}$) to a specific surface area by nitrogen adsorption ($S_{N2}$); i.e., ($S_{H2O}/S_{N2}$) of 0.6 or less, and a total silanol group content of 5% or less as determined by the following Formula (1):

$$\text{total silanol group content (\%)} = (Q2 \times 2/4 + Q3 \times 1/4 + Q4 \times 0/4) \quad \text{Formula (1)}$$

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms] as a dispersoid, and a $C_{1-4}$ alcohol as a dispersion medium;

step (B): a step of stirring an organic silicon compound having at least one substituent selected from the group consisting of an alkyl group, a $C_{6-12}$ aryl group, and a substituent having an unsaturated bond, and the silica sol prepared in step (A) under heating at 40 to 100° C. for 0.1 to 10 hours; and step (C): a step of removing the alcohol solvent from the silica sol after step (B).

A fifteenth aspect of the present invention is the production method for surface-modified silica particles according to the fourteenth aspect, wherein either or both of step (B) and step (C) is performed under reduced pressure.

A sixteenth aspect of the present invention is the production method for surface-modified silica particles according to the fourteenth aspect, wherein the silica sol prepared in step (A) has a water content of 0.1 to 2% by mass.

A seventeenth aspect of the present invention is the production method for surface-modified silica particles according to the fourteenth aspect, wherein the silica sol prepared in step (A) is obtained by replacing the solvent of an aqueous silica sol hydrothermally synthesized at 200 to 380° C. and 2 MPa to 22 MPa with a $C_{1-4}$ alcohol.

An eighteenth aspect of the present invention is a production method for a surface-modified silica dispersion, the production method comprising the following steps (A) and (B):

step (A): a step of preparing a silica sol containing silica particles having an average primary particle diameter of 5 to 120 nm, a ratio of a specific surface area by water vapor adsorption ($S_{H2O}$) to a specific surface area by nitrogen adsorption ($S_{N2}$); i.e., ($S_{H2O}/S_{N2}$) of 0.6 or less, and a total silanol group content of 5% or less as determined by the following Formula (1):

$$\text{total silanol group content (\%)} = (Q2 \times 2/4 + Q3 \times 1/4 + Q4 \times 0/4) \quad \text{Formula (1)}$$

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms] as a dispersoid, and a $C_{1-4}$ alcohol as a dispersion medium; and step (B): a step of stirring an organic silicon compound having at least one substituent selected from the group consisting of an alkyl group, a $C_{6-12}$ aryl group, and a substituent having an unsaturated bond, and the silica sol prepared in step (A) under heating at 40 to 100° C. for 0.1 to 10 hours.

A nineteenth aspect of the present invention is the production method for a surface-modified silica dispersion according to the eighteenth aspect, wherein the production method further comprises the following step (D):

step (D): a step of replacing the solvent of the silica sol after step (B) with at least one solvent selected from among alcohols, ketones, hydrocarbons, amides, esters, ethers, or amines.

Effects of the Invention

The silica particles and surface-modified silica of the present invention exhibit low dielectric properties, and can be effectively dispersed in an organic solvent. In addition, the silica particles of the present invention can form a composite material with an organic resin material, and thus are expected to be used for the production of, for example, a semiconductor device material.

MODES FOR CARRYING OUT THE INVENTION

<Silica Particles>

The silica particles of the present invention have a dielectric loss tangent of 0.01 or less at 1 GHz and satisfy the following (i), (ii), and (iii):

(i) an average primary particle diameter of 5 nm to 120 nm;

(ii) a ratio of a specific surface area by water vapor adsorption ($S_{H2O}$) to a specific surface area by nitrogen adsorption ($S_{N2}$); i.e., ($S_{H2O}/S_{N2}$) of 0.6 or less; and (iii) a total silanol group content of 5% or less as determined by the following Formula (1):

$$\text{total silanol group content (\%)} = (Q2 \times 2/4 + Q3 \times 1/4 + Q4 \times 0/4) \quad \text{Formula (1)}$$

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms].

<Average Primary Particle Diameter>

The average primary particle diameter of the silica particles of the present invention can be defined as the specific surface area diameter calculated from a specific surface area ($S_{N2}$) measured by the BET method using nitrogen gas as molecules adsorbed on the surfaces of the particles.

The specific surface area diameter (average primary particle diameter: D (nm)) is a primary particle diameter calculated by the formula: D (nm)=2,720/S from the specific surface area $S_{N2}$ (m$^2$/g) measured by the nitrogen adsorption method (BET method), and refers to the diameter of particles corresponding to spherical silica particles.

The silica particles of the present invention may have an average primary particle diameter of 5 nm to 120 nm, for example, 5 nm to 100 nm.

Silica particles having an average primary particle diameter of 5 nm to 100 nm exhibit a low dielectric loss tangent and can be effectively dispersed in an organic solvent. When a composite material containing the silica particles is molded into a product, defects can be prevented in the product, and the product can achieve high transparency.

<Specific Surface Area by Nitrogen Adsorption ($S_{N2}$)>

The silica particles of the present invention may have a specific surface area by nitrogen adsorption ($S_{N2}$) of 25 to 550 m$^2$/g, or 25 to 300 m$^2$/g, or 25 to 250 m$^2$/g.

A specific surface area ($S_{N2}$) of 25 to 250 m$^2$/g achieves a low dielectric loss tangent, and enables efficient surface modification with an organic silicon compound.

<Specific Surface Area by Water Vapor Adsorption ($S_{H2O}$)>

The specific surface area by water vapor adsorption ($S_{H2O}$) of the silica particles may be measured by the BET method using water vapor as molecules adsorbed on the surfaces of the particles.

The silica particles of the present invention may have a specific surface area by water vapor adsorption ($S_{H2O}$) of 5 to 500 m$^2$/g, or 5 to 300 m$^2$/g, or 5 to 100 m$^2$/g.

When the specific surface area ($S_{H2O}$) falls within the aforementioned numerical range, the silica particles can be effectively dispersed in an organic solvent, and the surface modification with an organic silicon compound can be efficiently performed. When the specific surface area ($S_{H2O}$) is 5 to 100 m$^2$/g, a reduction in dielectric loss tangent due to moisture absorption can be prevented.

<Specific Surface Area Ratio ($S_{H2O}$)/($S_{N2}$)>

The ratio of the specific surface area by water vapor adsorption ($S_{H2O}$) to the specific surface area by nitrogen adsorption ($S_{N2}$); i.e., ($S_{H2O}/S_{N2}$) is an index of the number of active points (surface silanol) present per particle surface area. A large value of ($S_{H2O}/S_{N2}$) indicates a large number of active points present on the silica surface.

The silica particles of the present invention may have the specific surface area ratio ($S_{H2O}/S_{N2}$) of 0.6 or less. The use of the silica particles having such a ($S_{H2O}/S_{N2}$) ratio prevents an increase in dielectric loss tangent, achieves good dispersibility in an organic solvent, and enables efficient silica particle surface modification with an organic silicon compound.

<Total Silanol Group Content>

Silica contains a silicon atom (Q4) not bonded to a hydroxy group, a silicon atom (Q3) bonded to one hydroxy group, a silicon atom (Q2) bonded to two hydroxy groups, and a silicon atom (Q1) bonded to three hydroxy groups.

In the present invention, silicon atoms contained in the silica generally have three structures as shown in the following Formulae: i.e., a silicon atom (Q2) bonded to two oxygen atoms and two hydroxy groups, a silicon atom (Q3) bonded to three oxygen atoms and one hydroxy group, and a silicon atom (Q4) bonded to four oxygen atoms.

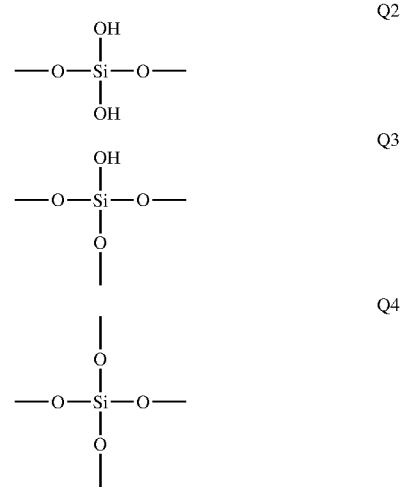

The amount of silanol (Si—OH) groups contained in the silica can be estimated by determining the proportions of silicon atoms Q2, Q3, and Q4 in the silica.

The term "total silanol group content" as used herein refers to a rate of silanol groups present in all the silicon atoms having the Q2 to Q4 structures contained in the silica particles.

The rate of silanol groups present in the silicon atoms having the aforementioned Q2 to Q4 structures may be determined by, for example, 29Si NMR spectroscopy using a water-dispersed silica sol containing the silica particles; i.e., the target for investigation of the rate of present silanol groups.

Specifically, the spectra obtained by 29Si NMR spectroscopy are subjected to waveform separation, and the peak observed at a chemical shift of −80 ppm to −105 ppm, the peak observed at a chemical shift of −90 ppm to −115 ppm, and the peak observed at a chemical shift of −95 ppm to −130 ppm are identified as being derived from the Q2 structure, the Q3 structure, and the Q4 structure, respectively. In this case, the proportion (%) of the peak area of each of Q2 to Q4 relative to the total (100%) of the peak areas of Q2 to Q4 corresponds to the proportion (mol %) of each of the structures (Q2 to Q4) contained in the silica particles (i.e., target for measurement). The total silanol group content (%) can be calculated according to the below-described formula by using the proportions of the structures Q2 to Q4 and the amount of hydroxy groups relative to the total amount by mole of oxygen atoms and hydroxy groups in each of the structures Q2 to Q4.

total silanol group content (%) =  Formula (1)

$(Q2 \times 2/4 + Q3 \times 1/4 + Q4 \times 0/4)$

In the aforementioned formula, each of Q2, Q3, and Q4 is the proportion (%) of the peak area derived from a silicon atom structure relative to the total (100%) of the peak areas derived from silicon atom structures as determined by $^{29}$Si NMR measurement; i.e., the proportion of each structure contained in the silica particles as determined from the results of the NMR measurement.

In the silica particles of the present invention, the total silanol group content is 5% or less. A total silanol group content of more than 5% causes failure to achieve dielectric properties such that both dielectric constant and dielectric loss tangent are low.

No particular limitation is imposed on the production method for the silica particles of the present invention. Preferably, the silica particles are produced through thermal treatment at 200 to 380° C. in water. The thermal treatment may be performed with a pressure-resistant container (autoclave).

<Organic Silicon Compound>

The silica particles of the present invention also include a mode wherein at least a portion of the surface of a silica particle is coated with an organic silicon compound having at least one substituent selected from the group consisting of an alkyl group, a $C_{6-12}$ aryl group, and a substituent having an unsaturated bond (these may be collectively referred to simply as "substituent"), or a mode wherein at least a portion of the surface of the silica particle is bonded to at least a portion of an organic silicon compound having at least one substituent selected from the group consisting of an alkyl group, a $C_{6-12}$ aryl group, and a substituent having an unsaturated bond; i.e., a mode of surface-modified silica particle wherein the particle surface is modified with an organic silicon compound (hereinafter, these modes may be collectively referred to as "surface-modified silica particles"). The expression "surface-modified" as used herein includes a mode wherein the surface of a silica particle is coated with the aforementioned organic silicon compound, and a mode wherein the organic silicon compound is bonded to the surface of the silica particle.

The expression "at least a portion of the surface of a silica particle is coated with an organic silicon compound" as used herein may be a mode wherein the below-described organic silicon compound covers at least a portion of the surface of the silica particle, and thus encompasses a mode wherein the organic silicon compound covers a portion of the surface of the silica particle, and a mode wherein the organic silicon compound covers the entire surface of the silica particle. In these modes, it does not matter whether or not the organic silicon compound is bonded to the surface of the silica particle.

The expression "at least a portion of the surface of a silica particle is bonded to at least a portion of an organic silicon compound" as used herein may be a mode wherein the below-described organic silicon compound is bonded to at least a portion of the surface of the silica particle, and thus encompasses, for example, a mode wherein the organic silicon compound is bonded to a portion of the surface of the silica particle, a mode wherein the organic silicon compound is bonded to a portion of the surface of the silica particle and covers at least a portion of the surface, and a mode wherein the organic silicon compound is bonded to the entire surface of the silica particle so as to cover the entire surface.

The organic silicon compound may be a compound having any of the aforementioned substituents. Examples of the organic silicon compound include a silicon compound having the aforementioned substituent and the below-described hydrolyzable group, an organic silicon compound having the aforementioned substituent and an Si—O—Si bond, and an organic silicon compound having the aforementioned substituent and an Si—N—Si bond. The surface-modified silica particles can be produced by modifying the surfaces of the aforementioned silica particles with such an organic silicon compound.

The substituents of the aforementioned organic silicon compound; i.e., the aforementioned alkyl group, $C_{6-12}$ aryl group, and substituent having an unsaturated bond are preferably $C_{1-10}$ alkyl groups (e.g., a methyl group, an ethyl group, a propyl group, an isopropyl group, and a decyl group), a phenyl group, a phenylmethyl group, and a vinyl group. When a plurality of substituents is present, the substituents may be identical to or different from one another.

The aforementioned hydrolyzable group is preferably an alkoxy group. When a plurality of hydrolyzable groups is present, the groups may be identical to or different from one another. The alkoxy group is preferably a $C_{13}$ alkoxy group, particularly preferably a methoxy group.

When the aforementioned organic silicon compound is a silicon compound having the aforementioned substituent and a hydrolyzable group, no particular limitation is imposed on the number of substituents and the number of hydrolyzable groups. Preferably, the number of the substituents is 1 to 3, and the number of hydrolyzable groups is 1 to 3 (the total number of the substituents and the hydrolyzable groups is 4 or less) per silicon atom.

Specific examples of the organic silicon compound having the aforementioned substituent and hydrolyzable group include methyltrimethoxysilane, dimethyldimethoxysilane, trimethylmethoxysilane, methyltriethoxysilane, dimethyldiethoxysilane, trimethylethoxysilane, methyltripropoxysilane, dimethyldipropoxysilane, trimethylpropoxysilane, phenyltrimethoxysilane, diphenyldimethoxysilane, phenyltriethoxysilane, diphenyldiethoxysilane, phenyltripropoxysilane, diphenyldipropoxysilane, phenylmethyldimethoxysilane, phenylmethyldiethoxysilane, phenyldipropoxysilane, vinyltrimethoxysilane, divinyldimethoxysilane, vinyltriethoxysilane, divinyldiethoxysilane, vinyltripropoxysilane, divinyldipropoxysilane, decyltrimethoxysilane, and hexamethyldisiloxane.

Of these, preferred are organic silicon compounds of the following Formulae (a) to (g).

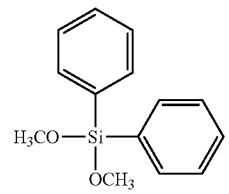

Formula (a)

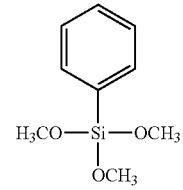

Formula (b)

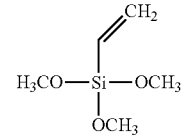

Formula (c)

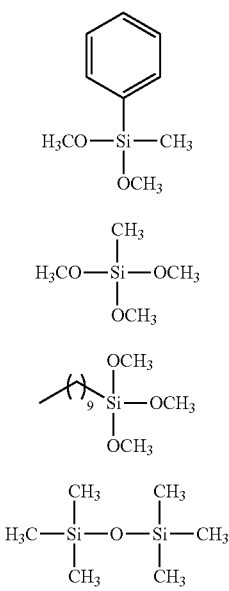

Formula (d)

Formula (e)

Formula (f)

Formula (g)

The substituents of the organic silicon compound having the aforementioned substituent and an Si—O—Si bond; i.e., the aforementioned alkyl group (e.g., $C_{1-10}$ alkyl group), $C_{6-12}$ aryl group, and substituents having an unsaturated bond are preferably a methyl group, a decyl group, a phenyl group, a phenylmethyl group, and a vinyl group. When a plurality of substituents is present, the substituents may be identical to or different from one another. The substituent is particularly preferably a methyl group. Specific examples of the organic silicon compound include hexamethyldisiloxane.

The substituents of the organic silicon compound having the aforementioned substituent and an Si—N—Si bond; i.e., the aforementioned alkyl group (e.g., $C_{1-10}$ alkyl group), $C_{6-12}$ aryl group, and substituents having an unsaturated bond are preferably a methyl group, a decyl group, a phenyl group, a phenylmethyl group, and a vinyl group. When a plurality of substituents is present, the substituents may be identical to or different from one another. The substituent is particularly preferably a methyl group. Specific examples of the organic silicon compound include hexamethyldisilazane.

The amount of surface treatment (modification) with the aforementioned organic silicon compound; i.e., the amount of the organic silicon compound that covers or binds to the surfaces of the silica particles may be, for example, about 0.5 to 6 molecules per $nm^2$ of the surface area of the silica particles.

No particular limitation is imposed on the production method for the surface-modified silica particles; i.e., the method for coating (treating) the surfaces of the silica particles with the aforementioned organic silicon compound. For example, at least one of the organic silicon compounds of Formulae (a) to (g) may be added to and mixed with an organic solvent dispersion of the silica particles, to thereby achieve surface modification of the silica particles through hydrolysis and condensation of the organic silicon compound.

The organic silicon compound may be added so that the surfaces of the silica particles are modified with the organic silicon compound in an amount of about 0.5 to 6.0 molecules per $nm^2$ of the surface area of the silica particles. For example, the organic silicon compound may be added in an amount of 0.5 to 10.0 molecules, or 1.0 to 8.0 molecules, or 1.0 to 6.0 molecules per $nm^2$ of the surface area of the silica particles. Excess of the organic silicon compound that do not contribute to the surface modification may be present in the reaction system. Preferably, the organic silicon compound is added in an amount of 1.0 to 6.0 molecules per $nm^2$ of the surface area of the silica particles.

The organic silicon compound may be completely hydrolyzed or partially hydrolyzed. The hydrolysis of the organic silicon compound requires water, and about 1 mol or more of water is preferably added per mol of the hydrolyzable group, [Si—O—Si] bond, or [Si—N—Si] bond of the organic silicon compound. Water contained in the organic solvent may be used.

When the organic silicon compound having a hydrolyzable group is used, the organic silicon compound may be completely hydrolyzed or partially hydrolyzed. The hydrolysis of the organic silicon compound requires water, and about 1 mol or more of water is preferably added per mol of the hydrolyzable group of the organic silicon compound. Water contained in the organic solvent may be used.

A catalyst may be used for the hydrolysis and condensation. The hydrolysis catalyst may be a chelate compound, an organic acid, an inorganic acid, an organic base, or an inorganic base, and these catalysts may be used alone or in combination. More specifically, for example, an aqueous hydrochloric acid solution, acetic acid, or an aqueous ammonia solution may be used.

<Measurement of Dielectric Properties>

Dry powder of silica particles and a dedicated device may be used for measurement of the dielectric constant and dielectric loss tangent of the silica particles. Examples of the dedicated device include a vector network analyzer (trade name: FieldFox N6626A, available from KEYSIGHT TECHNOLOGIES).

When the silica particles are mixed with an organic resin material to form a composite, and the composite is used for an insulator application, the silica particles preferably have a dielectric loss tangent of 0.01 or less, particularly preferably 0.009 or less, at a frequency of 1 GHz. The lower limit of the dielectric loss tangent is 0.00001, or 0.00005, or 0.0001, or 0.0005.

<Silica Dispersion (1)>

The silica dispersion of the present invention is a dispersion wherein the aforementioned silica particles are dispersed in water or an organic solvent. The surfaces of the silica particles, which are a dispersoid of the dispersion, may be or may not be modified (coated or bonded) with the aforementioned organic silicon compound.

Examples of the organic solvent include an alcohol, a ketone, an ether, and an amide.

Examples of the alcohol include $C_{1-5}$ alcohols, such as methanol, ethanol, isopropyl alcohol, and n-butanol.

Examples of the ketone include $C_{1-5}$ ketones, such as methyl ethyl ketone, methyl isobutyl ketone, γ-butyrolactone, N-methyl-2-pyrrolidone, and N-ethyl-2-pyrrolidone.

Examples of the ether include ethylene glycol monomethyl ether and propylene glycol monomethyl ether.

Examples of the amide include dimethylacetamide, N,N-dimethylformamide, dimethylacrylamide, acryloylmorpholine, and diethylacrylamide.

<Surface-Modified Silica Dispersion [Silica Dispersion (2)]>

The silica dispersion of the present invention also encompasses a mode of dispersion of the silica particles whose surfaces are modified (coated or bonded) with the aforementioned organic silicon compound (surface-modified silica particles). Hereinafter, this mode of dispersion will be referred to as "surface-modified silica dispersion" (or may be referred to as "dispersion of surface-modified silica particles").

The surface-modified silica dispersion of the present invention is a dispersion wherein the aforementioned surface-modified silica particles are dispersed in at least one organic solvent selected from among an alcohol, a ketone, a hydrocarbon, an amide, an ether, an ester, or an amine.

Examples of the alcohol include $C_{1-5}$ alcohols, such as methanol, ethanol, isopropyl alcohol, and n-butanol.

Examples of the ketone include $C_{1-5}$ ketones, such as methyl ethyl ketone, methyl isobutyl ketone, γ-butyrolactone, N-methyl-2-pyrrolidone, and N-ethyl-2-pyrrolidone.

Examples of the hydrocarbon include toluene, xylene, n-pentane, n-hexane, and cyclohexane.

Examples of the amide include dimethylacetamide, N,N-dimethylformamide, dimethylacrylamide, acryloylmorpholine, and diethylacrylamide.

Examples of the ether include ethylene glycol monomethyl ether and propylene glycol monomethyl ether.

Examples of the ester include ethyl acetate and butyl acetate.

Examples of the amine include triethylamine, tributylamine, N,N-dimethylaniline, pyridine, and picoline.

The amount of the surface-modified silica particles contained in the surface-modified silica dispersion may be expressed as (surface-modified) silica concentration. The surface-modified silica concentration can be calculated by weighing the residue obtained after baking of the surface-modified silica dispersion at 1,000° C. The surface-modified silica concentration of the surface-modified silica dispersion may be, for example, 1% by mass to 60% by mass, or 10% by mass to 60% by mass, or 10% by mass to 40% by mass.

The water content of the surface-modified silica dispersion is preferably 5% by mass or less. Such a water content may achieve good stability of the dispersion, and may facilitate formation of a composite material with an organic resin material.

<Composite Material>

The composite material of the present invention contains the silica particles of the present invention and an organic resin material. The surfaces of the silica particles, which are incorporated into the composition material, may be or may not be modified (coated or bonded) with the aforementioned organic silicon compound. In a preferred mode, the surface-modified silica particles may be used.

The organic resin material may be at least one selected from the group consisting of epoxy resin, phenolic resin, acrylic resin, maleimide resin, polyurethane, polyimide, polytetrafluoroethylene, cycloolefin polymer, unsaturated polyester, vinyltriazine, crosslinkable polyphenylene oxide, and curable polyphenylene ether.

No particular limitation is imposed on the production method for the composite material. For example, the composite material may be produced by mixing of a dispersion of the silica particles or the surface-modified silica particles with a monomer or polymer solution of the organic resin material to thereby prepare a polymerizable composition, and subsequent removal of excess solvent, followed by photocuring or thermal curing. Alternatively, the composite material may be produced by direct addition of powder of the silica particles or the surface-modified silica particles to a monomer or polymer solution of the organic resin material to thereby prepare a polymerizable composition, and subsequent removal of excess solvent, followed by photocuring or thermal curing.

The mixing ratio of the silica particles or the surface-modified silica particles to the monomer or polymer solution of the organic resin material may be adjusted so that the mass ratio of the (surface-modified) silica particles to the monomer or polymer of the organic resin material; i.e., the (surface-modified) silica particles:the monomer or polymer of the organic resin material is 1:100 to 0.1, for example, 1:20 to 0.1.

The polymerizable composition may be photocured or thermally cured by using a polymerization initiator. The photopolymerization initiator may be, for example, a photoradical polymerization initiator or a photocationic polymerization initiator. The thermal polymerization initiator may be, for example, a thermal radical polymerization initiator or a thermal cationic polymerization initiator. The polymerization initiator may be used in an amount of 0.01 parts by mass to 50 parts by mass relative to 100 parts by mass of the polymerizable composition.

The polymerizable composition may contain, as an optional component, any additive used in the art, such as a customary additive used in a conventional polymerizable composition (composite material), for example, a catalyst or pigment for curing acceleration, a radical scavenger (quencher), a leveling agent, a viscosity adjuster, an antioxidant, an ultraviolet absorber, a stabilizer, a plasticizer, or a surfactant.

The composite material of the present invention may be used as a semiconductor device material, a copper-clad laminate, a flexible wiring material, a flexible display material, an antenna material, an optical wiring material, or a sensing material by selecting an appropriate organic resin material according to the intended use.

<Production Method for Surface-Modified Silica Particles>

The surface-modified silica particles, which are a mode of the present invention, can be produced by a method including a step of mixing, in an organic solvent, silica particles having an average primary particle diameter of 5 nm to 120 nm, a ratio of a specific surface area by water vapor adsorption ($S_{H2O}$) to a specific surface area by nitrogen adsorption ($S_{N2}$); i.e., ($S_{H2O}/S_{N2}$) of 0.6 or less, and a total silanol group content of 5% or less with an organic silicon compound having an alkyl group, a $C_{6-12}$ aryl group, and a substituent having an unsaturated bond.

The aforementioned silica particles and organic silicon compound may be the same as those exemplified above.

In the aforementioned mixing step, the organic silicon compound may be added so that the surfaces of the silica particles are modified with the organic silicon compound in an amount of 0.5 to 6 molecules per $nm^2$ of the surface area of the silica particles. Specifically, the organic silicon compound may be added in an amount of 0.5 to 10.0 molecules, or 1.0 to 8.0 molecules, or 1.5 to 6.0 molecules per $nm^2$ of the surface area of the silica particles. Excess of the organic silicon compound that do not contribute to the surface modification may be present in the reaction system.

The organic solvent used in the aforementioned mixing step may be an organic solvent containing an alcohol and/or a ketone solvent.

Examples of the alcohol include $C_{1-5}$ alcohols, such as methanol, ethanol, isopropyl alcohol, and n-butanol.

Examples of the ketone solvent include $C_{1-5}$ ketone solvents, such as methyl ethyl ketone, methyl isobutyl ketone, and γ-butyrolactone.

No particular limitation is imposed on the aforementioned mixing step, so long as the step is performed at a temperature at which the hydrolysis and condensation reaction of the aforementioned organic silicon compound proceed. For example, the mixing step may be performed at a temperature of 20° C. or higher and lower than 120° C.

The mixing step is preferably performed at a temperature in the vicinity of the boiling point of the organic solvent from the viewpoint of reaction efficiency. For example, when an organic solvent containing methanol is used, the mixing step is preferably performed at 65° C. or thereabouts. If necessary, the reaction may be performed with an apparatus including a reflux apparatus, etc. for the purpose of preventing a change in silica concentration or organic silicon compound concentration in the mixing step. The mixing step may be performed multiple times at the same temperature, or may be performed multiple times at different temperatures.

The mixing step may be performed for 30 minutes to 24 hours. Preferably, the mixing step is performed within 24 hours from the industrial viewpoint.

The aforementioned mixing step may involve a step of pH adjustment with an organic amine. The pH adjustment step may be performed once or multiple times before, during, or after the mixing step.

The organic amine may be a secondary or tertiary amine. Examples of the usable secondary or tertiary amine include alkylamines, allylamines, aralkylamines, alicyclic amines, alkanolamines, and cyclic amines.

Specific examples of the organic amine include diethylamine, triethylamine, diisopropylamine, tri-isopropylamine, di-n-propylamine, tri-n-propylamine, diisobutylamine, di-n-butylamine, tri-n-butylamine, dipentylamine, tripentylamine, di-2-ethylhexylamine, di-n-octylamine, tri-n-octylamine, N-ethyldiisopropylamine, dicyclohexylamine, N,N-dimethylbutylamine, N,N-dimethylhexylamine, N,N-dimethyloctylamine, N,N-dimethylbenzylamine, piperidine, N-methylpiperidine, quinuclidine, triethanolamine, N-methyldiethanolamine, N,N-dimethylethanolamine, N,N-diethylethanolamine, N,N-dibutylethanolamine, triisopropanolamine, imidazole, imidazole derivatives, 1,8-diazabicyclo(5,4,0)undec-7-ene, 1,5-diaza-bicyclo(4,3,0)non-5-ene, and 1,4-diaza-bicyclo(2,2,2)octane, and diallylamine. These organic amines may be used singly or in combination of two or more species.

The organic amine may be added in an amount of 0.001 to 5% by mass or 0.01 to 1% by mass relative to the mass of the silica particles. The pH of the mixed solution may be adjusted to 4.0 to 11.0, preferably 7.5 to 9.5 by addition of the organic amine.

The liquid prepared after the mixing step; i.e., the liquid containing the surface-modified silica particles may be used as a surface-modified silica dispersion for the production of the aforementioned composite material.

At least a portion of the organic solvent contained in the mixture prepared through the aforementioned mixing step may be replaced with a different organic solvent from the viewpoint of, for example, facilitating the production of the composite material. The different organic solvent used may be at least one or two or more selected from the group consisting of alcohols, ketones, ethers, esters, hydrocarbons, and nitrogen-containing organic compounds. No particular limitation is imposed on the solvent for replacement, so long as it differs from the organic solvent contained in the mixture. The solvent for replacement may be selected from the viewpoint of the solubility in an organic resin material used for formation of a composite.

Examples of the different organic solvent include alcohols such as methanol, ethanol, isopropyl alcohol, and n-butanol; ketones such as methyl ethyl ketone, methyl isobutyl ketone, γ-butyrolactone, N-methyl-2-pyrrolidone, and N-ethyl-2-pyrrolidone; ethers such as ethylene glycol monomethyl ether and propylene glycol monomethyl ether; esters such as ethyl acetate and butyl acetate; hydrocarbons such as toluene, xylene, n-pentane, n-hexane, and cyclohexane; and nitrogen-containing organic compounds, for example, amides such as dimethylacetamide, N,N-dimethylformamide, dimethylacrylamide, acryloylmorpholine, and diethylacrylamide, and amines such as triethylamine, tributylamine, N,N-dimethylaniline, pyridine, and picoline.

The solvent replacement may be performed by any known method. For example, the replacement with a different organic solvent may be performed by evaporation with a rotary evaporator, or ultrafiltration with an ultrafiltration membrane.

A specific example of the production method for the surface-modified silica particles is a production method including the following steps (A) to (C). However, the present invention is not limited to such a method (steps).

Step (A): a step of preparing a silica sol containing silica particles having an average primary particle diameter of 5 to 120 nm, a ratio of a specific surface area by water vapor adsorption ($S_{H2O}$) to a specific surface area by nitrogen adsorption ($S_{N2}$); i.e., ($S_{H2O}/S_{N2}$) of 0.6 or less, and a total silanol group content of 5% or less as determined by the following Formula (1):

$$\text{total silanol group content (\%)} = \frac{}{(Q2 \times 2/4 + Q3 \times 1/4 + Q4 \times 0/4)} \quad \text{Formula (1)}$$

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms] as a dispersoid, and a $C_{1-4}$ alcohol as a dispersion medium.

Step (B): a step of stirring an organic silicon compound having at least one substituent selected from the group consisting of an alkyl group, a $C_{6-12}$ aryl group, and a substituent having an unsaturated bond, and the silica sol prepared in step (A) under heating at 40 to 100° C. for 0.1 to 10 hours.

Step (C): a step of removing the alcohol solvent from the silica sol after step (B).

In this production method, the amount of the organic silicon compound to be added and conditions for, for example, step (B) (i.e., hydrolysis) may be determined as described above.

The aforementioned silica sol prepared in step (A) may be a silica sol having a water content of 0.1 to 2% by mass.

The silica sol prepared in step (A) may be a silica sol obtained by replacing the solvent of an aqueous silica sol hydrothermally synthesized at 200 to 380° C. and 2 MPa to 22 MPa with a $C_{1-4}$ alcohol.

Either or both of step (B) and step (C) described above may be performed under reduced pressure.

If necessary, the production method may include a step of pH adjustment with the aforementioned organic amine before step (B), during step (B), and/or after step (B).

The aforementioned silica sol prepared after step (B) may be used as a surface-modified silica dispersion for the production of the aforementioned composite material. For example, the silica sol may be subjected to solvent replacement in step (D) described below.

Thus, specific examples of the production method for the surface-modified silica dispersion are a production method including the following steps (A) and (B), and a production method including the following steps (A), (B), and (D). However, the present invention is not limited to such a method (steps).

Step (A): a step of preparing a silica sol containing silica particles having an average primary particle diameter of 5 to 120 nm as a dispersoid, and a $C_{1-4}$ alcohol as a dispersion medium.

Step (B): a step of stirring an organic silicon compound having at least one substituent selected from the group consisting of an alkyl group, a $C_{6-12}$ aryl group, and a substituent having an unsaturated bond, and the silica sol prepared in step (A) under heating at 40 to 100° C. for 0.1 to 10 hours.

Step (D): a step of replacing the solvent of the silica sol after step (B) with at least one solvent selected from among alcohols, ketones, hydrocarbons, amides, esters, ethers, or amines.

In this production method, specific examples of alcohols, ketones, hydrocarbons, amides and amines (nitrogen-containing organic compounds), esters, and ethers, the solvent replacement method, etc. may be the same as those described above.

EXAMPLES

The present invention will next be described in more detail with reference to Examples and Comparative Examples, but the present invention should not be construed as being limited to the following Examples.

[Silica Sol]

Silica sols used in Examples and Comparative Examples are as described below. Table 1 shows the properties of silica particles contained in water-dispersed silica sols A to E.

Water-dispersed silica sol A (available from Nissan Chemical Corporation, pH 3, silica concentration: 20% by mass)

Water-dispersed silica sol B (available from Nissan Chemical Corporation, pH 3, silica concentration: 20% by mass)

Water-dispersed silica sol C (available from Nissan Chemical Corporation, pH 3, silica concentration: 34% by mass)

Water-dispersed silica sol D (available from Nissan Chemical Corporation, pH 3, silica concentration: 20% by mass)

Water-dispersed silica sol E (available from Nissan Chemical Corporation, pH 3, silica concentration: 20% by mass)

The water-dispersed silica sol E was produced through the procedure described below in Example 1-8.

TABLE 1

| | Average primary particle diameter (nm) | Specific surface area | | | Q2 to Q4 peak proportion (%) | | | Total silanol group content (%) |
|---|---|---|---|---|---|---|---|---|
| | | $S_{H2O}$ (m²/g) | $S_{N2}$ (m²/g) | $S_{H2O}/S_{N2}$ | Q2 | Q3 | Q4 | |
| Water-dispersed silica sol A | 45 | 23 | 60 | 0.38 | 2.8 | 9.6 | 87.6 | 3.8 |
| Water-dispersed silica sol B | 80 | 10 | 34 | 0.29 | 4.4 | 9.2 | 86.4 | 4.5 |
| Water-dispersed silica sol C | 80 | 38 | 34 | 1.12 | 3.0 | 9.0 | 88.0 | 3.8 |
| Water-dispersed silica sol D | 12 | 154 | 227 | 0.68 | 2.9 | 19.2 | 77.9 | 6.3 |
| Water-dispersed silica sol E | 74 | 13 | 37 | 0.34 | 1.8 | 4.6 | 93.6 | 2.1 |

Organic silicon compounds used are as follows.

PTMS: phenyltrimethoxysilane (trade name: KBM-103, available from Shin-Etsu Chemical Co., Ltd.)

MTMS: methyltrimethoxysilane (trade name: KBM-13, available from Shin-Etsu Chemical Co., Ltd.)

VTMS: vinyltrimethoxysilane (trade name: KBM-1003, available from Shin-Etsu Chemical Co., Ltd.)

DMDPS: dimethoxydiphenylsilane (trade name: KBM-202SS, available from Shin-Etsu Chemical Co., Ltd.)

DMMPS: dimethoxymethylphenylsilane (trade name: LS-2720, available from Shin-Etsu Chemical Co., Ltd.)

DTMS: decyltrimethoxysilane (trade name: KBM-3103C, available from Shin-Etsu Chemical Co., Ltd.)

HMDS: hexamethyldisiloxane (trade name: KF-96L-0.65CS, available from Shin-Etsu Chemical Co., Ltd.)

The below-described methods were used to measure and evaluate the properties of the water-dispersed silica sols A to E, dispersions of surface-modified silica particles prepared in Examples and Comparative Examples, and silica sols and dispersions during production of the surface-modified silica dispersions.

[Measurement of Silica Concentration]

The silica concentration of a water-dispersion silica sol, a dispersion of surface-modified silica particles, or a silica sol during production of the dispersion was calculated as follows: the silica sol or the dispersion was added to a crucible; the solvent was removed by heating; the resultant product was baked at 1,000° C., and the residue obtained through the baking was weighed for calculation.

[Method for Measurement of pH of Water-Dispersed Silica Sol]

The pH of a water-dispersed silica sol was measured with a pH meter (MM-43X, available from DKK-TOA CORPORATION).

[Method for Measurement of pH of Organic Solvent-Dispersed Silica Sol]

For measurement of the pH of a methanol-dispersed silica sol, the methanol-dispersed silica sol, methanol, and pure water were mixed in proportions by mass of 1:1:1, and the pH of the mixture was measured with a pH meter (MM-43X, available from DKK-TOA CORPORATION). The pH measured by this method was denoted by "pH (1+1+1)."

[Measurement of Specific Surface Area, Specific Surface Area Ratio, and Average Primary Particle Diameter]

<Measurement of Specific Surface Area by Water Vapor Adsorption ($S_{H2O}$)>

The specific surface area by water vapor adsorption ($S_{H2O}$) of silica particles contained in a water-dispersed silica sol was measured as follows. Water-soluble cations and anions contained in the water-dispersed silica sol were removed by using a cation-exchange resin (trade name: Amberlite IR-120B, available from The Dow Chemical Company), an anion-exchange resin (trade name: Amberlite IRA400J, available from The Dow Chemical Company), and a cation-exchange resin (trade name: Amberlite IR-120B, available from The Dow Chemical Company) in this order, and then the silica sol was dried at 290° C., to thereby prepare a measurement sample. The sample was subjected to measurement with a specific surface area measuring device by water vapor adsorption (Q5000SA, available from TA Instruments Japan Inc.).

<Measurement of Specific Surface Area by Nitrogen Adsorption ($S_{N2}$)>

The specific surface area by nitrogen adsorption ($S_{N2}$) of silica particles contained in a water-dispersed silica sol was measured as follows. Water-soluble cations contained in the water-dispersed silica sol were removed by using a cation-exchange resin (trade name: Amberlite IR-120B, available from The Dow Chemical Company), and then the silica sol was dried at 290° C., to thereby prepare a measurement sample. The sample was subjected to measurement with a specific surface area measuring device by nitrogen adsorption Monosorb (available from Quantachrome Instruments Japan G.K.).

[Ratio of Specific Surface Area by Water Vapor Adsorption to Specific Surface Area by Nitrogen Adsorption ($S_{H2O}/S_{N2}$)]

The specific surface area ratio was calculated from the above-measured specific surface area by water vapor adsorption and specific surface area by nitrogen adsorption by using the following formula.

$$\text{Specific surface area ratio } (S_{H2O}/S_{N2}) = \text{specific surface area by water vapor adsorption/specific surface area by nitrogen adsorption}$$

[Average Primary Particle Diameter]

The average primary particle diameter (i.e., diameter of particles corresponding to spherical particles) was calculated from the above-measured specific surface area by nitrogen adsorption $S_{N2}$ (m²/g) by using the following formula.

$$\text{Average primary particle diameter (nm)} = 2{,}720/S \text{ (m}^2\text{/g)}$$

[Measurement of Water Content]

The water content of a dispersion of surface-modified silica particles and the water content of a silica sol during production of the dispersion were measured by the Karl Fischer titration method using a Karl-Fischer moisture meter (trade name: MKA-610, available from Kyoto Electronics Manufacturing Co., Ltd.).

[Organic Solvent Content]

The organic solvent content of a dispersion of surface-modified silica particles was determined with a gas chromatograph (GC-2014s, available from Shimadzu Corporation).

Gas chromatographic conditions:
Column: 3 mm×1 m glass column
Filler: Porapak Q
Column temperature: 130 to 230° C. (temperature elevation: 8° C./min)
Carrier: $N_2$ 40 mL/min
Detector: FID
Injection amount: 1 µL
Internal standard: acetonitrile

[Measurement of Viscosity]

The viscosity of a dispersion during production of surface-modified silica particles was measured with an Ostwald viscometer (available from SIBATA SCIENTIFIC TECHNOLOGY LTD.)

[NMR Measurement and Calculation of Total Silanol Group Content]

<29Si NMR Spectroscopy>

0.5 mL of $D_2O$ was added to 2 mL of a water-dispersed silica sol to thereby prepare a measurement sample, and the sample was added to a polytetrafluoroethylene (PTFE)-made sample tube having a diameter of 10 mm for measurement. A 500 MHz nuclear magnetic resonance spectrometer (model name "ECA 500" available from JEOL Ltd.) was used, and one-dimensional NMR spectra were measured with an attached $^{29}$Si free probe having a diameter of 10 mm (observation nuclear: $^{29}$Si) under the following measurement conditions: 29Si resonance frequency: 99.36 MHz, spectrum width: 37.4 kHz, X_Pulse: 90°, Relaxation_Delay: 120 seconds, and measurement temperature: room temperature. Data was analyzed with Software "Delta 5.3.1" available from JEOL Ltd., and each peak of Fourier-transformed spectra was subjected to waveform separation analysis by using, as variable parameters, the center position, height, and half width of the peak prepared from Gauss waveform (Gauss Model). After the waveform separation, the peak observed at a chemical shift of −80 ppm to −105 ppm, the peak observed at a chemical shift of −90 ppm to −115 ppm, and the peak observed at a chemical shift of −95 ppm to −130 ppm were identified as being derived from a Q2 structure, a Q3 structure, and a Q4 structure, respectively.

<Total Silanol Group Content>

The total silanol group content of silica particles contained in a water-dispersed silica sol was calculated on the basis of the area of each peak obtained from the aforementioned $^{29}$Si NMR spectral data.

The proportion (%) of the area of each of the peaks (Q2, Q3, Q4) relative to the total (100%) of the areas of these peaks after the waveform separation was defined as the content rate of the corresponding structure, and the total silanol group content was calculated by use of the following Formula (1). Each of Q2, Q3, and Q4 in Formula (1) is the content rate of the corresponding structure obtained from the NMR measurement results.

$$\text{Total silanol group content (\%)} = \quad\quad \text{Formula (1)}$$
$$(Q2 \times 2/4 + Q3 \times 1/4 + Q4 \times 0/4)$$

[Measurement of Dielectric Constant and Dielectric Loss Tangent]

A powder sample (silica powder produced in Examples 2-1 to 2-9 and Comparative Examples 2-1 to 2-4 described below) was charged into a PTFE-made sample tube (length: 30 mm, inner diameter: 3 mm) with a cavity resonator jig for a measurement frequency of 1 GHz (available from KEYCOM Corporation), and then the dielectric constant and dielectric loss tangent of the measurement sample were measured with a vector network analyzer (trade name: FieldFox N6626A, available from KEYSIGHT TECHNOLOGIES).

When the measured dielectric loss tangent was 0.01 or less, the low dielectric property was evaluated as "OK," whereas when the measured dielectric loss tangent was more than 0.01, the low dielectric property was evaluated as "NG."

Example 1-1

Step (a): A glass-made reactor (inner volume: 3 L) having a stirrer, a condenser, a thermometer, and two inlet ports was charged with 2,500 g of the water-dispersed silica sol A, and the reactor was heated to thereby boil the silica sol. While the silica sol in the reactor was kept boiling, methanol vapor generated in a separate boiler was continuously blown into the silica sol in the reactor, to thereby replace water (i.e., dispersion medium) with methanol. The replacement was terminated when the water content of the resultant methanol dispersion reached 3.0% by mass or less, to thereby prepare 1,250 g of a methanol-dispersed silica sol.

The methanol-dispersed silica sol was found to have a silica concentration of 40.5% by mass, a water content of 1.5% by mass, and a viscosity of 2.0 mPa·s.

Step (b): A 2-L eggplant-shaped flask was charged with 1,000 g of the prepared methanol-dispersed silica sol. While the silica sol was stirred with a magnetic stirrer, PTMS was added in an amount of 2.0 molecules per $nm^2$ of the surface area of silica particles as determined by nitrogen adsorption, and the resultant mixture was heated to 60° C. and maintained for one hour. Thereafter, diisopropylamine was added to the mixture so as to achieve a pH (1+1+1) of 8 to 9, and the resultant mixture was heated to 60° C. and maintained for one hour. Subsequently, PTMS was further added in an amount of 1.0 molecule per nm of the surface area of silica particles, and the resultant mixture was heated to 60° C. and maintained for one hour, to thereby prepare a methanol dispersion of surface-modified silica particles. The total amount of added PTMS was 3.0 molecules per nm of the surface area of silica particles contained in the sol.

Step (c): Thereafter, the eggplant-shaped flask containing the methanol dispersion of surface-modified silica particles was set in a rotary evaporator. Methanol was distilled off at a bath temperature of 80° C. under a reduced pressure of 500 to 350 Torr while methyl ethyl ketone was supplied, and the dispersion medium was replaced with methyl ethyl ketone, to thereby prepare a methyl ethyl ketone dispersion of surface-modified silica particles.

The methyl ethyl ketone dispersion of surface-modified silica particles was found to have a silica concentration of 30.5% by mass, a water content of 0.1% by mass or less, and a methanol content of 0.1% by mass or less.

Example 1-2

The same operation as in steps (a) to (c) of Example 1-1 was performed, except that PTMS was replaced with VTMS in step (b) of Example 1-1, and VTMS (total) was added in an amount of 3.0 molecules per $nm^2$ of the surface area of silica particles contained in the silica sol, to thereby prepare a methanol-dispersed silica sol, a methanol dispersion of surface-modified silica particles, and a methyl ethyl ketone dispersion of surface-modified silica particles.

Example 1-3

The same operation as in steps (a) to (c) of Example 1-1 was performed, except that PTMS was replaced with DMDPS in step (b) of Example 1-1, and DMDPS (total) was added in an amount of 3.0 molecules per $nm^2$ of the surface area of silica particles contained in the silica sol, to thereby prepare a methanol-dispersed silica sol, a methanol dispersion of surface-modified silica particles, and a methyl ethyl ketone dispersion of surface-modified silica particles.

Example 1-4

The same operation as in steps (a) to (c) of Example 1-1 was performed, except that PTMS was replaced with DMMPS in step (b) of Example 1-1, and DMMPS (total) was added in an amount of 3.0 molecules per $nm^2$ of the surface area of silica particles contained in the silica sol, to thereby prepare a methanol-dispersed silica sol, a methanol dispersion of surface-modified silica particles, and a methyl ethyl ketone dispersion of surface-modified silica particles.

Example 1-5

The same operation as in steps (a) to (c) of Example 1-1 was performed, except that PTMS was replaced with MTMS in step (b) of Example 1-1, and MTMS (total) was added in an amount of 3.0 molecules per $nm^2$ of the surface area of silica particles contained in the silica sol, to thereby prepare a methanol-dispersed silica sol, a methanol dispersion of surface-modified silica particles, and a methyl ethyl ketone dispersion of surface-modified silica particles.

Example 1-6

Step (a): 660 g of the water-dispersed silica sol B was diluted to 1,000 g with methanol, and the diluted silica sol was added to an evaporator equipped with a 2-L eggplant-shaped flask. Subsequently, water was distilled off at 600 Torr while methanol was gradually added, to thereby replace water (i.e., dispersion medium) with methanol. The replacement was terminated when the water content of the resultant methanol dispersion reached 3.0% by mass or less, to thereby prepare 1,000 g of a methanol-dispersed silica sol.

The methanol-dispersed silica sol was found to have a silica concentration of 13.2% by mass, a water content of 1.6% by mass, and a viscosity of 0.9 mPa·s.

Further, the same operation as in steps (b) and (c) of Example 1-1 was performed, to thereby prepare a methanol dispersion of surface-modified silica particles, and a methyl ethyl ketone dispersion of surface-modified silica particles.

Example 1-7

The same operation as in steps (a) to (c) of Example 1-6 was performed, except that PTMS was replaced with DMMPS in step (b) of Example 1-6, and DMMPS (total) was added in an amount of 3.0 molecules per $nm^2$ of the surface area of silica particles contained in the silica sol, to thereby prepare a methanol-dispersed silica sol, a methanol dispersion of surface-modified silica particles, and a methyl ethyl ketone dispersion of surface-modified silica particles.

Example 1-8/Preparation of Water-Dispersed Silica Sol E

A SUS-made autoclave reactor (inner volume: 300 mL) was charged with 129 g of a water-dispersed silica sol (available from Nissan Chemical Corporation, silica concentration: 30% by mass, pH 11, average primary particle diameter: 46 nm) and 121 g of a water-dispersed silica sol (available from Nissan Chemical Corporation, silica concentration: 32% by mass, pH 3, average primary particle diameter: 9 nm), and hydrothermal treatment was performed at 300±20° C. for one hour. 100 g of the resultant sol was mixed with 30 g of a hydrogen-type strongly acidic cation-exchange resin (Amberlite (registered trademark) IR-120B), and the mixture was stirred for 30 minutes and then filtered, to thereby prepare 100 g of a water-dispersed silica sol E (pH 3, silica concentration: 20% by mass, average primary particle diameter: 74 nm).

Example 1-9

Step (a): 62 g of the water-dispersed silica sol E prepared in Example 1-8 was diluted to 130 g with methanol, and the diluted silica sol was added to an evaporator equipped with a 1-L eggplant-shaped flask. Subsequently, water was distilled off at 550 Torr while methanol was gradually added, to thereby replace water (i.e., dispersion medium) with methanol. The replacement was terminated when the water content of the resultant methanol dispersion reached 1.0% by mass or less, to thereby prepare 155 g of a methanol-dispersed silica sol.

The methanol-dispersed silica sol was found to have a silica concentration of 8% by mass and a water content of 0.5% by mass.

Step (b): A 200-mL eggplant-shaped flask was charged with 66 g of the prepared methanol-dispersed silica sol. While the silica sol was stirred with a magnetic stirrer, DMEMIPS (total) was added in an amount of 3.0 molecules per $nm^2$ of the surface area of silica particles contained in the silica sol (as determined by nitrogen adsorption), and the resultant mixture was heated to 60° C. and maintained for eight hours, to thereby prepare a methanol dispersion of surface-modified silica particles.

Step (c): Thereafter, the eggplant-shaped flask containing the methanol dispersion of surface-modified silica particles was set in a rotary evaporator. While methyl ethyl ketone was supplied, methanol was distilled off at a bath temperature of 80° C. under a reduced pressure of 600 to 400 Torr until the water content of the resultant methyl ethyl ketone dispersion reached 1.0% by mass or less. Thus, the dispersion medium was replaced with methyl ethyl ketone, to thereby prepare a methyl ethyl ketone dispersion of surface-modified silica particles.

The methyl ethyl ketone dispersion of surface-modified silica particles was found to have a silica concentration of 11% by mass, a water content of 0.03% by mass, and a methanol content of 1.3% by mass.

Example 1-10

Step (a): A glass-made reactor (inner volume: 3 L) having a stirrer, a condenser, a thermometer, and two inlet ports was charged with 2,500 g of the water-dispersed silica sol A, and the reactor was heated to thereby boil the silica sol. While the silica sol in the reactor was kept boiling, methanol vapor generated in a separate boiler was continuously blown into the silica sol in the reactor, to thereby replace water (i.e., dispersion medium) with methanol. The replacement was terminated when the water content of the resultant methanol dispersion reached 3.0% by mass or less, to thereby prepare 1,250 g of a methanol-dispersed silica sol.

The methanol-dispersed silica sol was found to have a silica concentration of 40.5% by mass, a water content of 1.5% by mass, and a viscosity of 2.5 mPa-s.

Step (b): A 2-L eggplant-shaped flask was charged with 1,000 g of the prepared methanol-dispersed silica sol. While the silica sol was stirred with a magnetic stirrer, 150 g of methyl ethyl ketone (MEK) was added and DMMPS was added in an amount of 3 molecules per $nm^2$ of the surface area of silica particles as determined by nitrogen adsorption, and the resultant mixture was heated to 60° C. and maintained for three hours. Subsequently, HMDS was added in an amount of 5 molecules per $nm^2$ of the surface area of silica particles, and the resultant mixture was heated to 60° C. and maintained for three hours. Thereafter, diisopropylamine was added to the mixture so as to achieve a pH (1+1+1) of 8.0 to 10.0, and the resultant mixture was heated to 60° C. and maintained for one hour, to thereby prepare a methanol/MEK dispersion of surface-modified silica particles.

Step (c): Thereafter, the eggplant-shaped flask containing the methanol/MEK dispersion of surface-modified silica particles was set in a rotary evaporator. Methanol was distilled off at a bath temperature of 80° C. under a reduced pressure of 550 to 350 Torr while methyl ethyl ketone was supplied, and the dispersion medium was completely replaced with methyl ethyl ketone, to thereby prepare a methyl ethyl ketone dispersion of surface-modified silica particles.

The methyl ethyl ketone dispersion of surface-modified silica particles was found to have a silica concentration of 42.7% by mass, a water content of 0.1% by mass or less, and a methanol content of 0.1% by mass or less.

Example 1-11

The same operation as in steps (a) to (c) of Example 1-10 was performed, except that DMMPS was replaced with DTMS in step (b) of Example 1-10, DTMS was added in an amount of 1.0 molecule per $nm^2$ of the surface area of silica particles contained in the silica sol, and the resultant mixture was maintained at 60° C. for three hours, to thereby prepare a methanol-dispersed silica sol, a methanol/MEK dispersion of surface-modified silica particles, and a methyl ethyl ketone dispersion of surface-modified silica particles.

Example 1-12

The same operation as in steps (a) to (c) of Example 1-10 was performed, except that DTMS was added in an amount of 1.0 molecule per nm of the surface area of silica particles contained in the silica sol after addition of DMMPS in step (b) of Example 1-10, the resultant mixture was maintained at 60° C. for three hours, and then HMDS was added in an amount of 5 molecules per $nm^2$ of the surface area of silica particles, to thereby prepare a methanol-dispersed silica sol, a methanol/MEK dispersion of surface-modified silica particles, and a methyl ethyl ketone dispersion of surface-modified silica particles.

Example 1-13

The same operation as in Example 1-10 was performed, except that DMMPS was replaced with HMDS, and HMDS was added in an amount of 5 molecules per nm² of the surface area of silica particles contained in the silica sol, to thereby prepare a methyl ethyl ketone dispersion of surface-modified silica particles.

Comparative Example 1-1

Step (a): 1,029.4 g of the water-dispersed silica sol C was added to an evaporator equipped with a 2-L eggplant-shaped flask. Subsequently, water was distilled off at 600 Torr while methanol was gradually added, to thereby replace water (i.e., dispersion medium) with methanol. The replacement was terminated when the water content of the resultant methanol dispersion reached 3.0% by mass or less, to thereby prepare 1,000 g of a methanol-dispersed silica sol.

The methanol-dispersed silica sol was found to have a silica concentration of 35% by mass, a water content of 1.5% by mass, and a viscosity of 1.3 mPa·s.

Further, the same operation as in steps (b) and (c) of Example 1-1 was performed, to thereby prepare a methanol dispersion of surface-modified silica particles, and a methyl ethyl ketone dispersion of surface-modified silica particles.

Comparative Example 1-2

Step (a): 1,525 g of the water-dispersed silica sol D was added to an evaporator equipped with a 2-L eggplant-shaped flask. Subsequently, water was distilled off at 600 Torr while methanol was gradually added, to thereby replace water (i.e., dispersion medium) with methanol. The replacement was terminated when the water content of the resultant methanol dispersion reached 3.0% by mass or less, to thereby prepare 1,000 g of a methanol-dispersed silica sol.

The methanol-dispersed silica sol was found to have a silica concentration of 30.5% by mass, a water content of 1.7% by mass, and a viscosity of 1.6 mPa·s.

Further, the same operation as in steps (b) and (c) of Example 1-1 was performed, to thereby prepare a methanol dispersion of surface-modified silica particles, and a methyl ethyl ketone dispersion of surface-modified silica particles.

Comparative Examples 1-3 and 1-4

The water-dispersed silica sols C and D were used in Comparative Examples 1-3 and 1-4, respectively.

Example 2-1

The methyl ethyl ketone dispersion of surface-modified silica particles prepared in Example 1-1 was dried with a vacuum drier at 100° C., and the resultant silica gel was pulverized with a mortar, followed by further drying at 150° C. for one hour, to thereby produce silica powder.

The dielectric constant and dielectric loss tangent of the resultant silica powder were measured at 23° C. and a frequency of 1 GHz. Table 2 shows the dielectric properties of the resultant surface-modified silica particles.

Examples 2-2 to 2-7 and Comparative Examples 2-1 and 2-2

The same operation as in Example 2-1 was performed on the methyl ethyl ketone dispersion of surface-modified silica particles prepared in each of Examples 1-2 to 1-7 and Comparative Examples 1-1 and 1-2, to thereby produce silica powder, and the dielectric constant and dielectric loss tangent of the silica powder were measured. Table 2 shows the dielectric properties of the resultant surface-modified silica particles.

Example 2-8

The same operation as in Example 2-1 was performed on the water-dispersed silica sol E prepared in Example 1-8, to thereby produce silica powder, and the dielectric constant and dielectric loss tangent of the silica powder were measured. Table 2 shows the dielectric properties of the resultant silica particles.

Examples 2-9

The same operation as in Example 2-1 was performed on the methyl ethyl ketone dispersion of surface-modified silica particles prepared in Example 1-9, to thereby produce silica powder, and the dielectric constant and dielectric loss tangent of the silica powder were measured. Table 2 shows the dielectric properties of the resultant surface-modified silica particles.

Examples 2-10 to 2-13

The same operation as in Example 2-1 was performed on the methyl ethyl ketone dispersion of surface-modified silica particles prepared in each of Examples 1-10 to 1-13, to thereby produce silica powder, and the dielectric constant and dielectric loss tangent of the silica powder were measured. Table 2 shows the dielectric properties of the resultant surface-modified silica particles.

Comparative Examples 2-3 and 2-4

The same operation as in Example 2-1 was performed on each of the water-dispersed silica sol C (Comparative Example 1-3) and the water-dispersed silica sol D (Comparative Example 1-4), to thereby produce silica powder, and the dielectric constant and dielectric loss tangent of the silica powder were measured. Table 2 shows the dielectric properties of the resultant silica particles.

TABLE 2

| | Classification | | Average primary particle diameter (nm) | $S_{H_2O}/S_{N_2}$ | Total silanol group content (%) | Silane species for surface modification | Dielectric constant | Dielectric loss tangent | Evaluation |
|---|---|---|---|---|---|---|---|---|---|
| Example 2-1 | Example 1-1 | Water-dispersed silica sol A | 45 | 0.38 | 3.8 | PTMS | 4.6 | 0.008 | OK |
| Example 2-2 | Example 1-2 | Water-dispersed silica sol A | 45 | 0.38 | 3.8 | VTMS | 4.6 | 0.009 | OK |
| Example 2-3 | Example 1-3 | Water-dispersed silica sol A | 45 | 0.38 | 3.8 | DMDPS | 4.8 | 0.009 | OK |
| Example 2-4 | Example 1-4 | Water-dispersed silica sol A | 45 | 0.38 | 3.8 | DMMPS | 4.6 | 0.008 | OK |
| Example 2-5 | Example 1-5 | Water-dispersed silica sol A | 45 | 0.38 | 3.8 | MTMS | 4.5 | 0.008 | OK |

TABLE 2-continued

| | Classification | | Average primary particle diameter (nm) | $S_{H2O}/S_{N2}$ | Total silanol group content (%) | Silane species for surface modification | Dielectric constant | Dielectric loss tangent | Evaluation |
|---|---|---|---|---|---|---|---|---|---|
| Example 2-6 | Example 1-6 | Water-dispersed silica sol B | 80 | 0.29 | 4.5 | PTMS | 4.5 | 0.006 | OK |
| Example 2-7 | Example 1-7 | Water-dispersed silica sol B | 80 | 0.29 | 4.5 | DMMPS | 4.6 | 0.005 | OK |
| Example 2-8 | Example 1-8 | Water-dispersed silica sol E | 74 | 0.34 | 2.1 | None | 4.4 | 0.010 | OK |
| Example 2-9 | Example 1-9 | Water-dispersed silica sol E | 74 | 0.34 | 2.1 | DMMPS | 4.5 | 0.005 | OK |
| Example 2-10 | Example 1-10 | Water-dispersed silica sol A | 45 | 0.38 | 3.8 | DMMPS + HMDS | 4.5 | 0.007 | OK |
| Example 2-11 | Example 1-11 | Water-dispersed silica sol A | 45 | 0.38 | 3.8 | DTMS + HMDS | 4.5 | 0.008 | OK |
| Example 2-12 | Example 1-12 | Water-dispersed silica sol A | 45 | 0.38 | 3.8 | DMMPS + DTMS + HMDS | 4.8 | 0.007 | OK |
| Example 2-13 | Example 1-13 | Water-dispersed silica sol A | 45 | 0.38 | 3.8 | HMDS | 4.4 | 0.008 | OK |
| Comparative Example 2-1 | Comparative Example 1-1 | Water-dispersed silica sol C | 80 | 1.12 | 3.8 | PTMS | 4.8 | 0.015 | NG |
| Comparative Example 2-2 | Comparative Example 1-2 | Water-dispersed silica sol D | 12 | 0.68 | 6.3 | PTMS | 5.4 | 0.022 | NG |
| Comparative Example 2-3 | Comparative Example 1-3 | Water-dispersed silica sol C | 80 | 1.12 | 3.8 | None | 5.0 | 0.021 | NG |
| Comparative Example 2-4 | Comparative Example 1-4 | Water-dispersed silica sol D | 12 | 0.68 | 6.3 | None | 6.2 | 0.043 | NG |

As shown in Table 2, the silica particles of each of Examples 1-1 to 1-13, which had an average primary particle diameter of 5 nm to 120 nm, a ratio of surface area by water vapor adsorption/surface area by nitrogen adsorption ($S_{H2O}/S_{N2}$) of 0.6 or less, and a total silanol group content of 5% or less, exhibited a dielectric loss tangent of 0.01 or less at a frequency of 1 GHz. The results indicated that the silica particles exhibit very excellent low dielectric properties.

In contrast, the silica particles of each of Comparative Examples 1-1 to 1-4, which had an average primary particle diameter of 5 nm to 120 nm, but a ratio of surface area by water vapor adsorption/surface area by nitrogen adsorption ($S_{H2O}/S_{N2}$) of more than 0.6 and/or a total silanol group content of more than 5%, exhibited a dielectric loss tangent of more than 0.01. Thus, the silica particles exhibited poor low dielectric properties.

The surface-modified silica particles (i.e., silica particles coated with an organic silicon compound) of each of Examples 1-1 to 1-7 and 1-13, which had an average primary particle diameter of 5 nm to 120 nm, a ratio of surface area by water vapor adsorption/surface area by nitrogen adsorption ($S_{H2O}/S_{N2}$) of 0.6 or less, and a total silanol group content of 5% or less, exhibited a dielectric loss tangent of 0.01 or less at a frequency of 1 GHz. The results indicated that the silica particles exhibit very excellent low dielectric properties.

The present invention achieves a dielectric loss tangent less than half that of a conventional hydrophobized silica sol, and is expected to be used in high-frequency applications.

The invention claimed is:

1. Silica particles having a dielectric loss tangent of 0.01 or less at 1 GHz and satisfying the following (i), (ii), and (iii):
   (i) an average primary particle diameter of 5 nm to 120 nm;
   (ii) a ratio of a specific surface area by water vapor adsorption ($S_{H2O}$) to a specific surface area by nitrogen adsorption ($S_{N2}$); i.e., ($S_{H2O}/S_{N2}$) of 0.6 or less; and
   (iii) a total silanol group content of 5% or less as determined by the following Formula (1):

$$\text{total silanol group content (\%)} = \frac{(Q2 \times 2/4 + Q3 \times 1/4 + Q4 \times 0/4)}{} \quad \text{Formula (1)}$$

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms],
   wherein at least a portion of the surface of each of the silica particles is coated with an organic silicon compound having at least one substituent selected from the group consisting of an alkyl group, a $C_{6-12}$ aryl group, and a substituent having an unsaturated bond, and
   wherein the surfaces of the silica particles are coated with or bonded to the organic silicon compound in an amount of 0.5 to 6 molecules per nm$^2$ of the surface area of the silica particles.

2. The silica particles according to claim 1, wherein at least a portion of the surface of each of the silica particles is bonded to at least a portion of an organic silicon compound having at least one substituent selected from the group consisting of an alkyl group, a $C_{6-12}$ aryl group, and a substituent having an unsaturated bond.

3. The silica particles according to claim 1, wherein the substituent of the organic silicon compound is at least one selected from the group consisting of a $C_{1-10}$ alkyl group, a phenyl group, a phenylmethyl group, and a vinyl group.

4. The silica particles according to claim 1, wherein the organic silicon compound is a compound having the substituent and a hydrolyzable group.

5. The silica particles according to claim 1, wherein the organic silicon compound is at least one selected from among compounds of the following Formulae (a) to (g):

Formula (a)

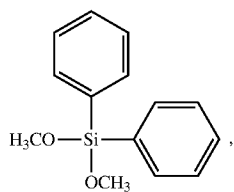

Formula (b)

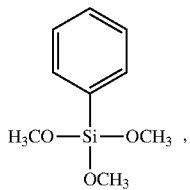

Formula (c)

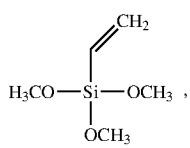

Formula (d)

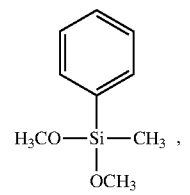

Formula (e)

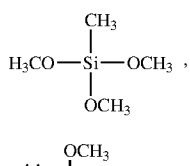

Formula (f)

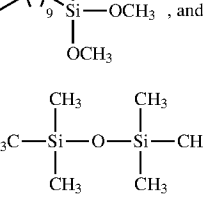, and

Formula (g)

6. The silica particles according to claim 1, wherein the silica particles are produced by a surface treatment of a silica sol and directly prior to the surface treatment, the silica sol is boiled in water and placed in a methanol dispersion with a water content of 3.0% by mass or less.

7. A silica dispersion comprising the silica particles according to claim 1 dispersed in water or an organic solvent.

8. A silica dispersion comprising the silica particles according to claim 1 dispersed in at least one organic solvent selected from among alcohols, ketones, hydrocarbons, amides, ethers, esters, or amines.

9. A composite material comprising the silica particles according to claim 1, and an organic resin material.

10. The composite material according to claim 9, wherein the organic resin material is at least one selected from the group consisting of epoxy resin, phenolic resin, acrylic resin, maleimide resin, polyurethane, polyimide, polytetrafluoroethylene, cycloolefin polymer, unsaturated polyester, vinyltriazine, crosslinkable polyphenylene oxide, and curable polyphenylene ether.

11. The composite material according to claim 9, wherein the composite material is used for an application selected from the group consisting of a semiconductor device material, a copper-clad laminate, a flexible wiring material, a flexible display material, an antenna material, an optical wiring material, and a sensing material.

12. A production method for surface-modified silica particles having a dielectric loss tangent of 0.01 or less at 1 GHz, the production method comprising a step of mixing, in an organic solvent, silica particles having an average primary particle diameter of 5 nm to 120 nm, a ratio of a specific surface area by water vapor adsorption ($S_{H2O}$) to a specific surface area by nitrogen adsorption ($S_{N2}$); i.e., ($S_{H2O}/S_{N2}$) of 0.6 or less, and a total silanol group content of 5% or less as determined by the following Formula (1):

$$\text{total silanol group content (\%)} = \frac{}{(Q2 \times 2/4 + Q3 \times 1/4 + Q4 \times 0/4)} \quad \text{Formula (1)}$$

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms] with an organic silicon compound having at least one substituent selected from the group consisting of an alkyl group, a $C_{6-12}$ aryl group, and a substituent having an unsaturated bond, wherein at least a portion of the surface of each of the silica particles is coated with an organic silicon compound having at least one substituent selected from the group consisting of an alkyl group, a $C_{6-12}$ aryl group, and a substituent having an unsaturated bond, and wherein the surfaces of the silica particles are coated with or bonded to the organic silicon compound in an amount of 0.5 to 6 molecules per nm$^2$ of the surface area of the silica particles.

13. A production method for surface-modified silica particles having a dielectric loss tangent of 0.01 or less at 1 GHz, the production method comprising the following steps (A) to (C):

step (A): a step of preparing a silica sol containing silica particles having an average primary particle diameter of 5 to 120 nm, a ratio of a specific surface area by water vapor adsorption ($S_{H2O}$) to a specific surface area by nitrogen adsorption ($S_{N2}$); i.e., ($S_{H2O}/S_{N2}$) of 0.6 or less, and a total silanol group content of 5% or less as determined by the following Formula (1):

total silanol group content (%) = $(Q2 \times 2/4 + Q3 \times 1/4 + Q4 \times 0/4)$    Formula (1)

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms] as a dispersoid, and a $C_{1-4}$ alcohol as a dispersion medium, step (B): a step of stirring an organic silicon compound and the silica sol prepared in step (A) under heating at 40 to 100° C. for 0.1 to 10 hours, wherein at least a portion of the surface of each of the silica particles is coated with the organic silicon compound which has at least one substituent selected from the group consisting of an alkyl group, a $C_{6-12}$ aryl group, and a substituent having an unsaturated bond, and wherein the surfaces of the silica particles are coated with or bonded to the organic silicon compound in an amount of 0.5 to 6 molecules per nm$^2$ of the surface area of the silica particles; and step (C): a step of removing the $C_{1-4}$ alcohol from the silica sol after step (B).

14. The production method for surface-modified silica particles according to claim 13, wherein either or both of step (B) and step (C) is performed under reduced pressure.

15. The production method for surface-modified silica particles according to claim 13, wherein the silica sol prepared in step (A) has a water content of 0.1 to 2% by mass.

16. The production method for surface-modified silica particles according to claim 13, wherein the silica sol prepared in step (A) is obtained by replacing the water of an aqueous silica sol hydrothermally synthesized at 200 to 380° C. and 2 MPa to 22 MPa with the $C_{1-4}$.

17. A production method for a surface-modified silica dispersion, the production method comprising the following steps (A) and (B):

step (A): a step of preparing a silica sol containing silica particles having a dielectric loss tangent of 0.01 or less at 1 GHz and having an average primary particle diameter of 5 to 120 nm, a ratio of a specific surface area by water vapor adsorption ($S_{H2O}$) to a specific surface area by nitrogen adsorption ($S_{N2}$); i.e., ($S_{H2O}/S_{N2}$) of 0.6 or less, and a total silanol group content of 5% or less as determined by the following Formula (1):

total silanol group content (%) = $(Q2 \times 2/4 + Q3 \times 1/4 + Q4 \times 0/4)$    Formula (1)

[in Formula (1), each of Q2, Q3, and Q4 is the proportion (%) of the peak area derived from a silicon atom structure relative to the total (100%) of the peak areas derived from silicon atom structures as determined by $^{29}$Si NMR measurement, wherein Q2 is the proportion of the peak area derived from the structure of a silicon atom bonded to two oxygen atoms and two hydroxy groups, Q3 is the proportion of the peak area derived from the structure of a silicon atom bonded to three oxygen atoms and one hydroxy group, and Q4 is the proportion of the peak area derived from the structure of a silicon atom bonded to four oxygen atoms] as a dispersoid, and a $C_{1-4}$ alcohol as a dispersion medium; and step (B): a step of stirring an organic silicon compound and the silica sol prepared in step (A) under heating at 40 to 100° C. for 0.1 to 10 hours, wherein at least a portion of the surface of each of the silica particles is coated with the organic silicon compound which has at least one substituent selected from the group consisting of an alkyl group, a $C_{6-12}$ aryl group, and a substituent having an unsaturated bond, and wherein the surfaces of the silica particles are coated with or bonded to the organic silicon compound in an amount of 0.5 to 6 molecules per nm$^2$ of the surface area of the silica particles.

18. The production method for a surface-modified silica dispersion according to claim 17, wherein the production method further comprises the following step (D):

step (D): a step of replacing $C_{1-4}$ alcohol of the silica sol after step (B) with at least one solvent selected from among alcohols, ketones, hydrocarbons, amides, esters, ethers, or amines.

* * * * *